(12) United States Patent
Vernon

(10) Patent No.: US 6,910,646 B2
(45) Date of Patent: Jun. 28, 2005

(54) AGGREGATE SPREADER AND METHODS OF USE

(76) Inventor: Jeffrey H. Vernon, 1 Waterside La., Essex, CT (US) 06426

( * ) Notice: Subject to any disclaimer, the term of this patent is extended or adjusted under 35 U.S.C. 154(b) by 11 days.

(21) Appl. No.: 10/356,696

(22) Filed: Jan. 31, 2003

(65) Prior Publication Data

US 2004/0159723 A1 Aug. 19, 2004

(51) Int. Cl.[7] .............................................. A01C 15/00
(52) U.S. Cl. ........................ 239/650; 239/651; 239/657; 239/661
(58) Field of Search ................................ 269/650, 651, 269/657, 661, 663, 668, 670

(56) References Cited

U.S. PATENT DOCUMENTS

| | | | | |
|---|---|---|---|---|
| 2,565,427 | A | * 8/1951 | Herd | 239/661 |
| 3,195,899 | A | * 7/1965 | Neuenschwander | 239/651 |
| 3,767,126 | A | 10/1973 | van der Lely | 239/661 |
| 3,782,642 | A | 1/1974 | Trafford | 239/683 |
| 3,869,655 | A | 3/1975 | Sousek | 318/519 |
| 4,316,581 | A | 2/1982 | van der Lely et al. | 239/682 |
| 4,351,481 | A | 9/1982 | Dreyer | 239/670 |
| 4,442,979 | A | 4/1984 | Küpper | 239/656 |
| 4,449,648 | A | 5/1984 | Gustavsson | 222/164 |
| 4,497,446 | A | 2/1985 | van der Lely et al. | 239/661 |
| 4,588,113 | A | 5/1986 | Egerdahl | 222/626 |
| 4,712,717 | A | 12/1987 | Egerdahl | 222/252 |
| 4,842,202 | A | 6/1989 | van der Lely et al. | 239/661 |
| 4,938,650 | A | 7/1990 | Jenkins et al. | 414/469 |
| 5,004,163 | A | 4/1991 | van der Lely et al. | 239/661 |
| 5,046,664 | A | 9/1991 | van der Lely et al. | 239/661 |
| 6,062,319 | A | 5/2000 | Schwalenberg et al. | 172/272 |
| 6,112,438 | A | 9/2000 | Weagley | 37/270 |
| 6,116,526 | A | 9/2000 | Bom et al. | 239/682 |
| 6,425,196 | B1 | 7/2002 | Weagley et al. | 37/270 |
| 2002/0117562 | A1 | * 8/2002 | Kost | 239/666 |

OTHER PUBLICATIONS

"New Scarifier Works by Itself or in Combination with other Attachments" Attachment Update; Worksaver Fall 2001, p. 16.

* cited by examiner

*Primary Examiner*—Patrick Brinson
(74) *Attorney, Agent, or Firm*—Ohlandt, Greeley, Ruggiero & Perle

(57) ABSTRACT

An aggregate spreader having a container, a mounting flange, and a spreading assembly is provided. The container has an aggregate receiving cavity. The mounting flange extends from the container to removably connect the container to a stick of a tractor so that the container is movable by a hydraulic cylinder of the tractor between a spreading position and a loading position. The spreading assembly spreads aggregate disposable in the aggregate receiving cavity.

10 Claims, 5 Drawing Sheets

AGGREGATE SPREADER AND METHODS OF USE

BACKGROUND OF THE INVENTION

1. Field of the Invention

The present invention relates to aggregate spreaders and methods of use. More particularly, the present invention relates to an aggregate spreader that is connectable to the rear-end of a tractor.

2. Description of Related Art

It is common to equip tractors or other heavy machinery ("tractor") with a front-end attachment, such as a loader, bucket, plow, and other analogous implements. It is also common to equip tractors with a rear-end attachment. The rear-end attachment is typically a single, movable arm, commonly referred to as a stick. The rear-end can be used with attachments such as a shovel or backhoe, a jackhammer, and other such attachments.

These tractors are commonly used in the farming, construction, excavation, landscaping, and snow-removal industries. The same tractor is often used to perform one function in the summer, such as a landscaping function, and different functions during the winter, such as snow-removal. Thus, it is desirable to have attachments for tractors that allow this type of flexibility between different types of functions.

Snowplow attachments for tractors are shown and described in U.S. Pat. Nos. 6,112,438 and 6,425,196, the contents of which are incorporated herein in their entirety by reference. The plow attachments are connected to the front-end of the tractor, where it can be used to plow, push or otherwise remove snow from streets, driveways, parking lots, sidewalks, and other surfaces.

During snow removal, there is also a need to spread sand, salt, and/or other aggregates to further improve the conditions of the pavement for driving, walking, and the like. Currently, a separate spreader machine is used to spread the aggregate.

Some prior spreader machines connect to the front-end of the tractor. In use, the plow attachment must first be removed before using the spreader machine. Alternately, the spreader machine can be connected to a front-end of separate tractor or pickup truck. The separate tractor or truck then follows behind the plowing tractor to spread the desired aggregate. However, these prior methods can increase the cost and time associated with such snow removal operations.

Accordingly, there is a continuing need for aggregate spreaders that allow simultaneous use of the front-end and rear-end of a tractor.

SUMMARY OF THE INVENTION

It is an object of the present invention to provide an aggregate spreader.

It is another object of the present invention to provide an aggregate spreader that is removably connectable to the rear-end of a tractor.

It is a further object of the present invention to provide a method of simultaneously using the front-end of a tractor for a first operation and the rear-end of the tractor for an aggregate spreading operation.

It is yet another object of the present invention to provide a method of simultaneously removing snow and spreading salt using a tractor.

These and other objects and advantages of the present invention are achieved by an aggregate spreader having a container, a mounting flange, and a spreading assembly. The container defines an aggregate receiving cavity. The mounting flange extends from a wall of the container to removably connect the container to a stick of a tractor so that the container is movable by a hydraulic cylinder of the tractor between a spreading position and a loading position. The spreading assembly spreads aggregate disposable in the aggregate receiving cavity.

The present invention also provides a tractor having a front-end, a rear-end, and an aggregate spreader. The front-end has a bucket, while the rear-end has a stick and a hydraulic cylinder. The aggregate spreader is removably connected to the stick and to the hydraulic cylinder so that the aggregate spreader is movable by the hydraulic cylinder between a spreading position and a loading position. The aggregate spreader has a spreading assembly for spreading aggregate when the aggregate spreader is in the spreading position.

In addition, the present invention provides a method of plowing snow using a tractor. The method includes moving a bucket at a front-end of the tractor to a plowing position, moving an aggregate spreader at a rear-end to a spreading position, and moving the tractor so that the bucket plows snow while spreading an aggregate from the aggregate spreader.

The above-described and other features and advantages of the present invention will be appreciated and understood by those skilled in the art from the following detailed description, drawings, and appended claims

DETAILED DESCRIPTION OF THE INVENTION

Figure 1:
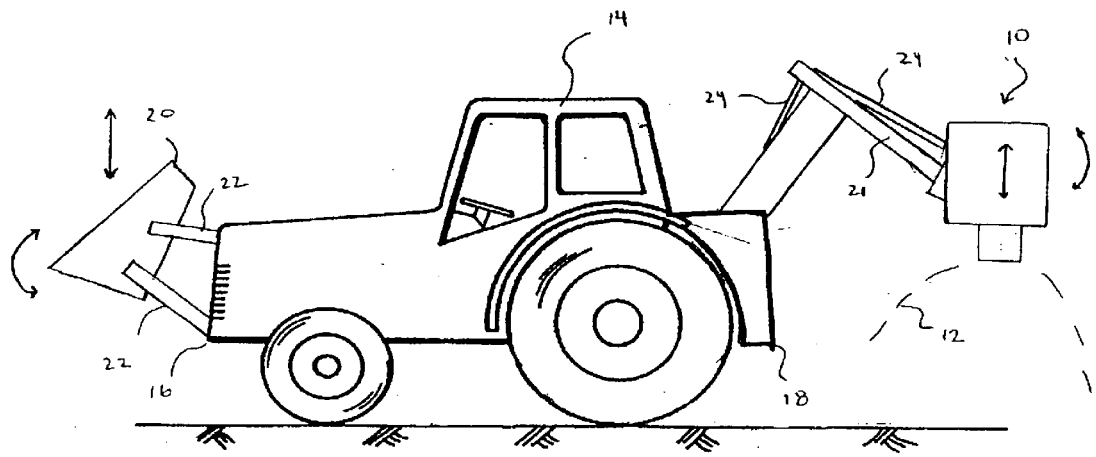
FIG. 1 is a side view of a tractor having an aggregate spreader according to the present invention.

Referring to the drawings and in particular to FIG. 1, an aggregate spreader generally referenced by reference numeral 10 is shown. Spreader 10 spreads an aggregate 12, such as, but not limited to salt, sand, stone, seed, and mulch. Spreader 10 is removably connected to a tractor 14.

Tractor 14 has a front-end 16 and a rear-end 18. Front-end 16 has a bucket 20 removably connected thereto. Tractor 14 can control front-end 16 to move bucket 20 in one or more desired directions. For example, front-end 16 can include hydraulic cylinders 22 for lifting and rotating bucket 20 in a known manner.

Spreader 10 is removably connected to rear-end 18 of tractor 14. Rear-end 18 has a movable stick 21 and one or more hydraulic cylinders 24. Tractor 14 can control hydraulic cylinders 24 to move stick 21 and, thus, spreader 10 in one or more desired directions.

Spreader 10 allows tractor 14 to simultaneously plow snow with bucket 20 and spread aggregate 12 with the spreader. It should be recognized that tractor 14 is described by way of example simultaneously using bucket 20 to plow snow and spreader 10 to spread salt or sand. Of course, it is contemplated by the present invention for spreader 10 to allow tractor 14 to perform many other activities simultaneously. For example, bucket 20 can be used to grade an area, while spreader 10 spreads grass seed.

Figure 2:
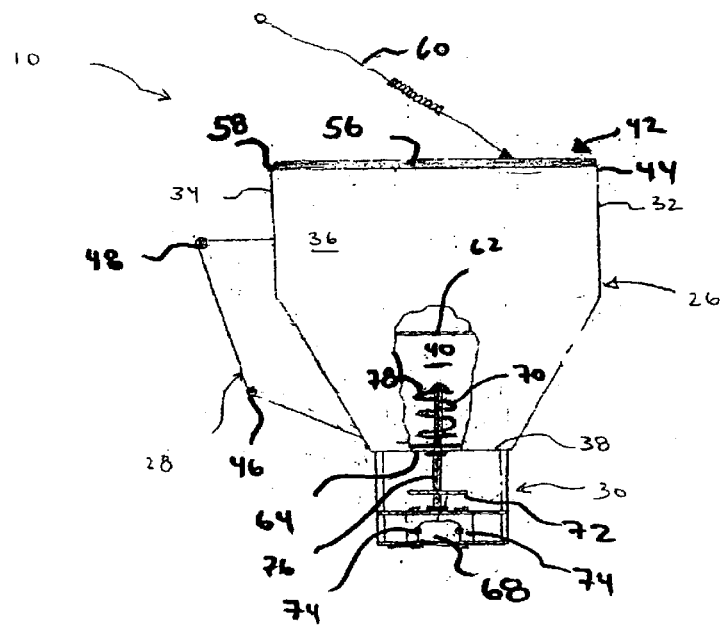
FIG. 2 is a partial sectional view of the aggregate spreader of FIG. 1.

As shown in FIG. 2, spreader 10 has a container 26, a mounting flange 28, and a spreading assembly 30. Container 26 defines a cavity 40 sized to hold desired amounts of aggregate 12. Preferably, the container has a front wall 32, a rear wall 34, a pair of sidewalls 36 (only one shown), and a bottom-wall 38 that define cavity 40. Container 26 has a loading opening 42 at its upper end 44. Thus, container 26 can receive aggregate 12 into cavity 40 through opening 42.

Figure 3:
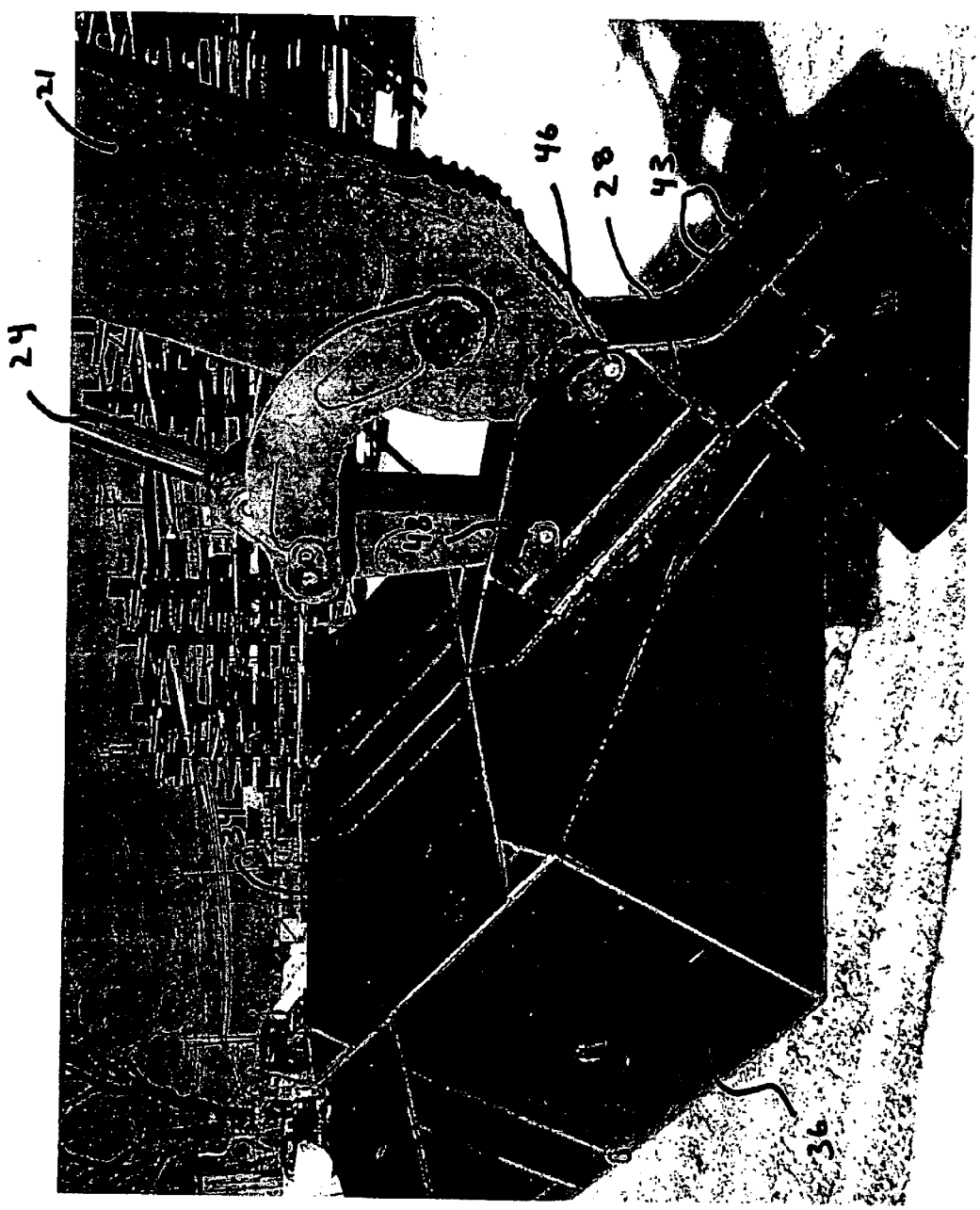
FIG. 3 is a first perspective view of the aggregate spreader of FIG. 1.
Figure 4:
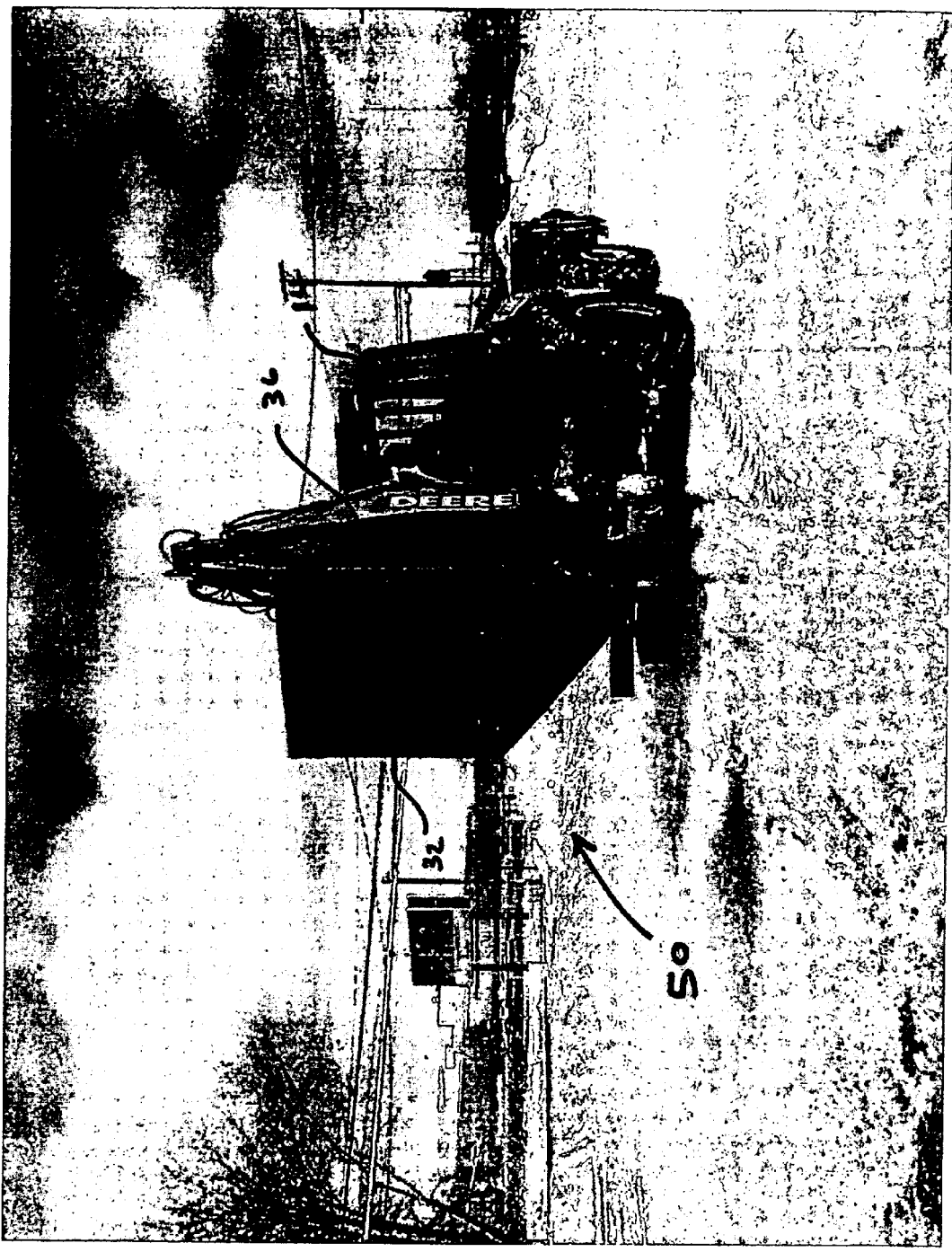
FIG. 4 is a second perspective view of the aggregate spreader of FIG. 1 mounted on a tractor.
Figure 5:
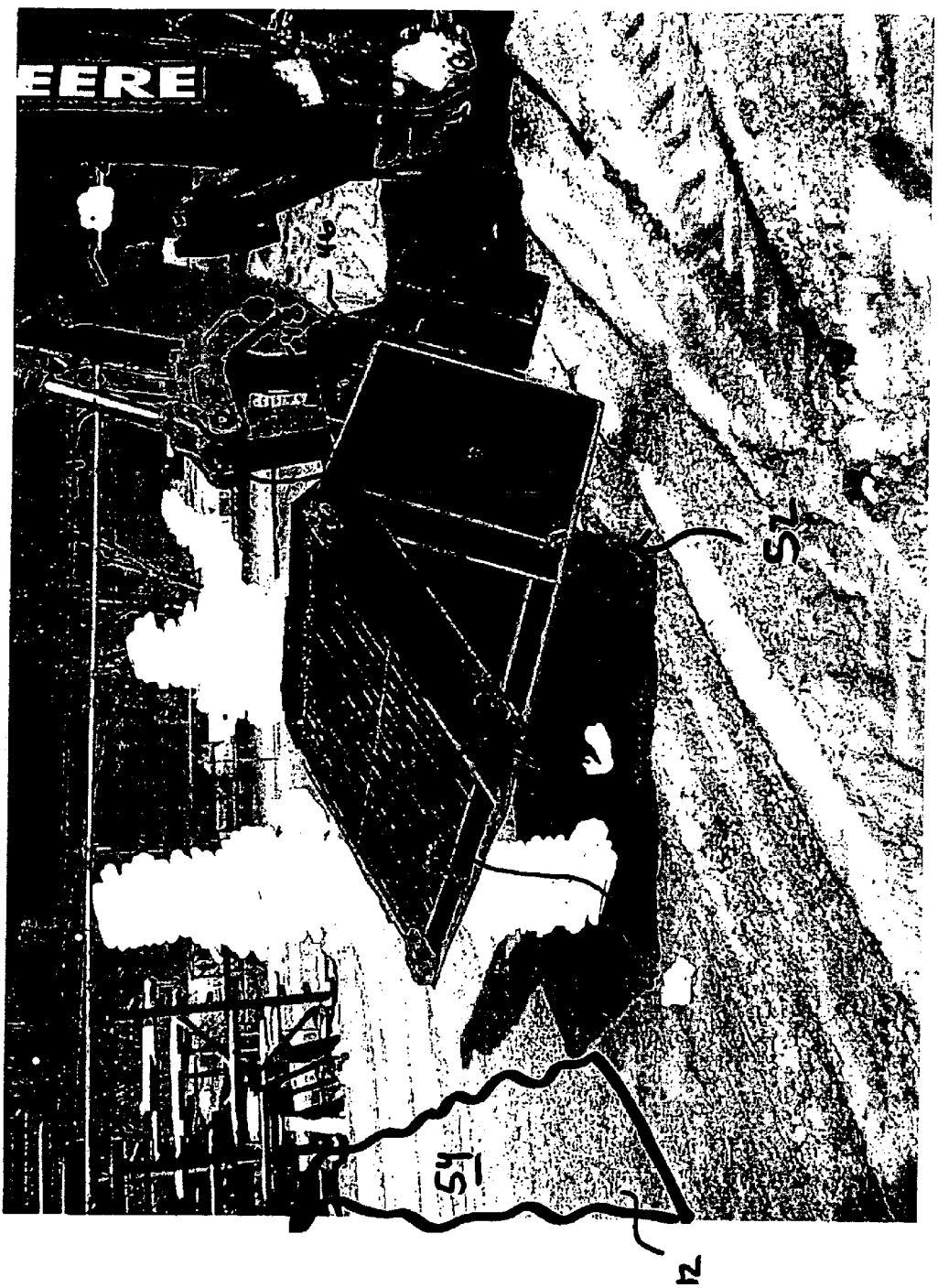
FIG. 5 is a third perspective view of the aggregate spreader of FIG. 1.

Mounting flange 28 is described with simultaneous reference to FIGS. 3 through 5. Mounting flange 28 preferably extends from rear wall 34. Additionally, mounting flange 28 preferably removably connects spreader 10 to stick 21 so that hydraulic cylinders 24 of tractor 14 can rotate and lift the spreader.

Mounting flange 28 can have a pair of walls 43, a pivot connector 46, and a drive connector 48. Stick 21 and hydraulic cylinder 24 are received between walls 45 so that pivot connector 46 secures mounting flange 28 to the stick, while drive connector 48 secures the mounting flange to the hydraulic cylinder.

Extension and retraction of hydraulic cylinder 24 acts on drive connector 48 to pivot spreader 10 about pivot connector 46. In this manner, tractor 14 can pivot spreader 10 between a first or spreading position 50 illustrated in FIG. 5 and a second or loading position 52 illustrated in FIG. 6. Thus, tractor 14 can move container 26 to load position 52 so that aggregate 12 from an aggregate supply 54 can be scooped into cavity 40 through opening 42. Additionally, tractor 14 can move container 26 to spreading position 50 so that aggregate 12 can be spreader from container 26.

Container 26 can have a lid 56 secured to rear wall 34 with a hinge 58. Lid 56 protects aggregate 12 from exposure to wind, rain, snow, and the like. In addition, lid 56 can aid in maintaining aggregate 12 in container 26 during movement of tractor 14.

Additionally, lid 56 can have a cable 60 securing the lid to rear-end 18. Cable 60 is maintained in a loose or slack state when container 26 is in spreading position 50. However, rotation of container 26 from spreading position 50 towards loading position 52 tightens cable 60 so that lid 56 opens. Lid 56 closes as container 26 is rotated from loading position 52 back towards spreading position 50 due to the forces of gravity on the lid. Thus, lid 56 automatically opens and closes as container 26 is rotated between spreading and loading positions 50, 52, respectively.

Container 26 can also have a material separation grate 62. As aggregate 12 is scooped into cavity 40, grate 62 ensures that the aggregate entering cavity 40 has a desired size. For example, grate 62 can prevent clumps of aggregate 12 larger than openings in the grate (not shown) from entering spreading assembly 30. Grate 62 is, preferably, positioned at opening 42 of cavity 40 as shown in FIG. 5. However, it is also contemplated by the present invention for grate 62 to be positioned in cavity 40 over spreading assembly 30 as shown in FIG. 2.

Figure 6:
FIG. 6 is a first perspective view of the spreading assembly of the aggregate spreader of FIG. 1.

Spreading assembly 30 is shown in FIGS. 2 and 6. Spreading assembly 30 is, preferably, disposed adjacent to bottom-wall 38. Bottom-wall 38 has one or more discharge openings 64 that place cavity 40 in fluid communication with the exterior of container 26.

Spreading assembly 30 has a motor 68, an auger 70, and a spreading blade 72. Motor 68 is, preferably, a hydraulic motor that is driven by the hydraulic pump (not shown) of tractor 14. In this embodiment, spreading assembly 30 has a pair of hydraulic fluid ports 74 that allow motor 68 to be in fluid communication with the hydraulic pump of tractor 14. Of course, it is contemplated for motor 68 to be an electric motor that is self-powered or powered by tractor 14.

Motor 68 drives a shaft 76 that has auger 70 and spreading blade 72 disposed thereon. Thus, motor 68 drives auger 70 and spreading blade 72. Auger 70 has a number or plurality of threads 78 disposed in cavity 40. Rotation of auger 70 by motor 68 causes threads 78 to push aggregate 12 out of cavity 40 through discharge openings 64. Aggregate 12 dispensed from discharge openings 64 is directed towards spreading blade 72. Rotation of spreading blade 72 by motor 68 causes the blade to throw or spread aggregate 12 radially outward from the blade.

Spreading assembly 30 can also include a guide 80. Guide 80 can guide or direct any aggregate 12 spread by spreading blade 72 in a desired direction (e.g., away from tractor 14).

Also, spreading assembly 30 can include a flow control member (not shown) disposed at discharge openings 64. The flow control member can selectively place cavity 40 in fluid communication with the exterior of container 26 through discharge openings 64. For example, the flow control member can have a first position sealing discharge openings 64 and a second position opening the discharge openings. In this manner, spreading assembly 30 can selectively spread aggregate 12 as desired.

In use, tractor 14 has bucket 20 disposed at front-end 16 and aggregate spreader 10 at rear-end 18.

Tractor 14 is controlled to rotate container 26 to loading position 52. Rear-end 18 is then controlled to scoop aggregate 12 of a desired size from supply 54 into cavity 40. Next, tractor 14 is controlled to rotate container 26 to spreading position 50, and bucket 20 is moved to its lower or plowing position. As tractor 14 is driven over a snow covered surface, motor 68 is activated and flow control member (if any) is opened. Thus, spreader 10 allows tractor 14 to simultaneously plow and spread aggregate.

It should also be noted that the terms "first", "second", "third", "upper", "lower", "front", "rear", and the like may be used herein to modify various elements. These modifiers do not imply a spatial, sequential, or hierarchical order to the modified elements unless specifically stated.

While the present invention has been described with reference to one or more exemplary embodiments, it will be understood by those skilled in the art that various changes may be made and equivalents may be substituted for elements thereof without departing from the scope of the present invention. In addition, many modifications may be made to adapt a particular situation or material to the teachings of the disclosure without departing from the scope thereof. Therefore, it is intended that the present invention not be limited to the particular embodiment(s) disclosed as the best mode contemplated for carrying out this invention, but that this invention will include all embodiments falling within the scope of the appended claims.

What is claimed is:

1. An aggregate spreader comprising:
   a container defining an aggregate receiving cavity;
   a mounting flange extending from said container, said
      mounting flange for removably connecting said container to a tractor having a stick and a hydraulic cylinder so that said container is movable by the hydraulic cylinder between a spreading position and a loading position;

a spreading assembly for spreading aggregate disposable in said aggregate receiving cavity; and a lid for said aggregate receiving cavity, said lid being rotatably connected to said container.

2. The aggregate spreader as in claim 1, wherein said spreading assembly spreads said aggregate when said container is in said spreading position.

3. The aggregate spreader as in claim 1, further comprising a cable for securing said lid to the stick so that said cable rotates said lid upon movement of said container to said loading position.

4. The aggregate spreader as in claim 1, further comprising an aggregate separation grate for preventing clumps of said aggregate from entering said spreading assembly.

5. The aggregate spreader as in claim 1, wherein said spreading assembly comprises a motor that is drivable by a portion of the tractor.

6. An aggregate spreader comprising:

a container defining an aggregate receiving cavity;

a mounting flange extending from said container, said mounting flange for removably connecting said container to a stick and a hydraulic cylinder of a tractor so that said container is movable by movement of both the hydraulic cylinder and the stick; and a spreading assembly for spreading aggregate disposable in said aggregate receiving cavity.

7. The aggregate spreader as in claim 6, further comprising a lid for said aggregate receiving cavity, said lid being rotatably connected to said container.

8. The aggregate spreader as in claim 7, further comprising a cable for securing said lid to the stick so that said cable rotates said lid upon movement of said container to a desired position.

9. An aggregate spreader comprising:

a container defining an aggregate receiving cavity;

a mounting flange extending from said container, said mounting flange for removably connecting said container to a stick and a hydraulic cylinder of a tractor so that said container is movable by movement of the hydraulic cylinder and the stick;

a spreading assembly for spreading aggregate disposable in said aggregate receiving cavity; and a lid for said aggregate receiving cavity, said lid being rotatably connected to said container.

10. The aggregate spreader as in claim 9, further comprising a cable for securing said lid to the stick so that said cable rotates said lid upon movement of said container to a desired position.

* * * * *